United States Patent [19]

Dorreboom

[11] 4,084,199
[45] Apr. 11, 1978

[54] HIGH DENSITY MULTITRACK MAGNETIC HEAD

[75] Inventor: Jelmer Dorreboom, Olivenhain, Calif.

[73] Assignee: Spin Physics, Inc., San Diego, Calif.

[21] Appl. No.: 735,729

[22] Filed: Oct. 26, 1976

[51] Int. Cl.² ............................................... G11B 5/22
[52] U.S. Cl. .................................... 360/121; 360/125
[58] Field of Search ............................. 360/119–122, 360/125; 29/603

[56] References Cited

U.S. PATENT DOCUMENTS

| | | | |
|---|---|---|---|
| 3,593,414 | 7/1971 | Beun et al. | 360/121 X |
| 3,668,775 | 6/1972 | Morita et al. | 29/603 |
| 3,761,641 | 9/1973 | Mlinaric | 360/121 |
| 3,807,042 | 4/1974 | Braitberg et al. | 360/121 X |
| 3,842,494 | 10/1974 | Chiba et al. | 360/121 |
| 3,843,968 | 10/1974 | Kroon | 360/121 |
| 3,851,375 | 12/1974 | Koorneef | 29/603 X |
| 3,909,932 | 10/1975 | Kroon | 360/121 |

FOREIGN PATENT DOCUMENTS

1,474,522  11/1969  Germany ........................ 360/121

Primary Examiner—John H. Wolff
Attorney, Agent, or Firm—Robert F. Cody

[57] ABSTRACT

The front face of a multitrack magnetic head has a stack of track defining pole pairs and spacers between the pole pairs of adjacent tracks. The spacers are slotted, and shields reside in the slots. A chamfer runs longitudinally of the stack. Embracing opposite sides of the stack and parallel to the chamfer, are non-magnetic wing parts, such parts being part of a surround used in the manufacture of the front face. Bonding glass, in the form of a unitary "lattice" fills the chamfer, and the spacings between the ceramic and shields, and the wing parts and stack.

The method for forming the head employs a surround having a depth greater than the depth of the stack, thereby forming a basin for accepting the bonding glass.

6 Claims, 15 Drawing Figures

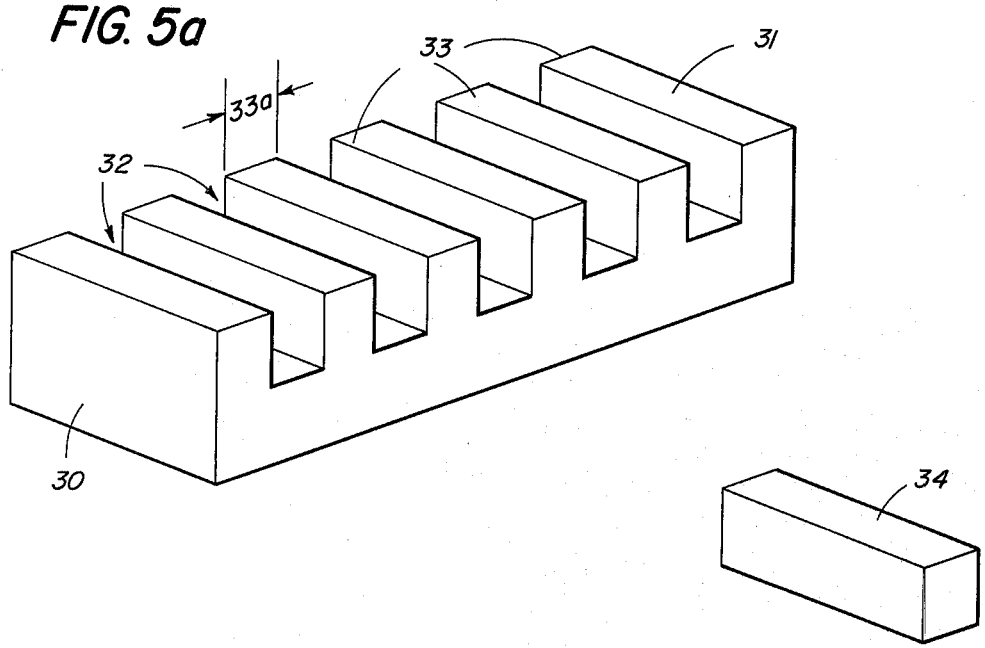
FIG. 5a
FIG. 5b
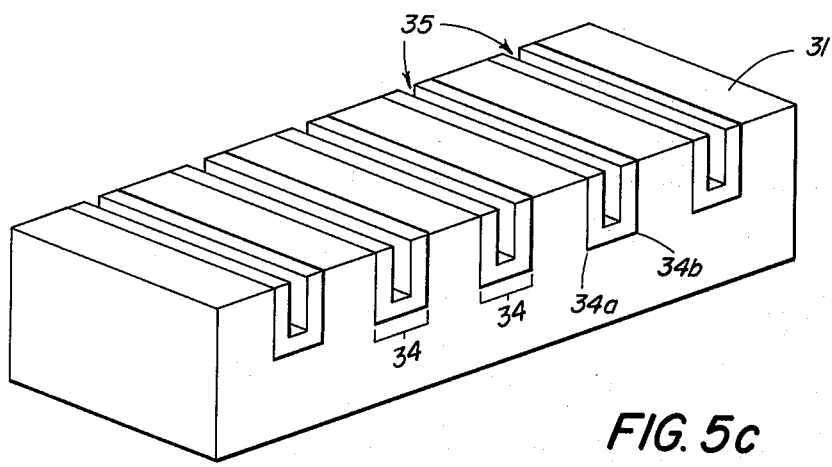
FIG. 5c

FIG. 5d
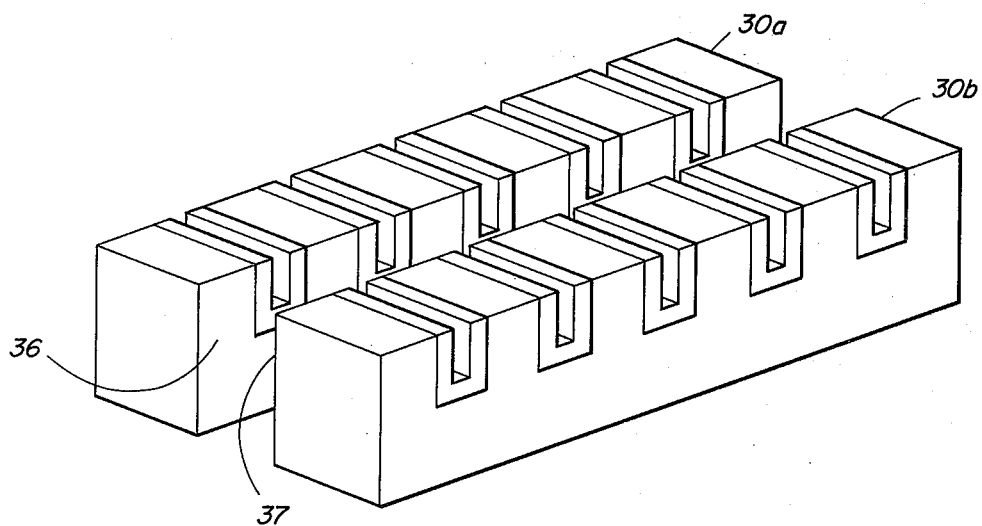
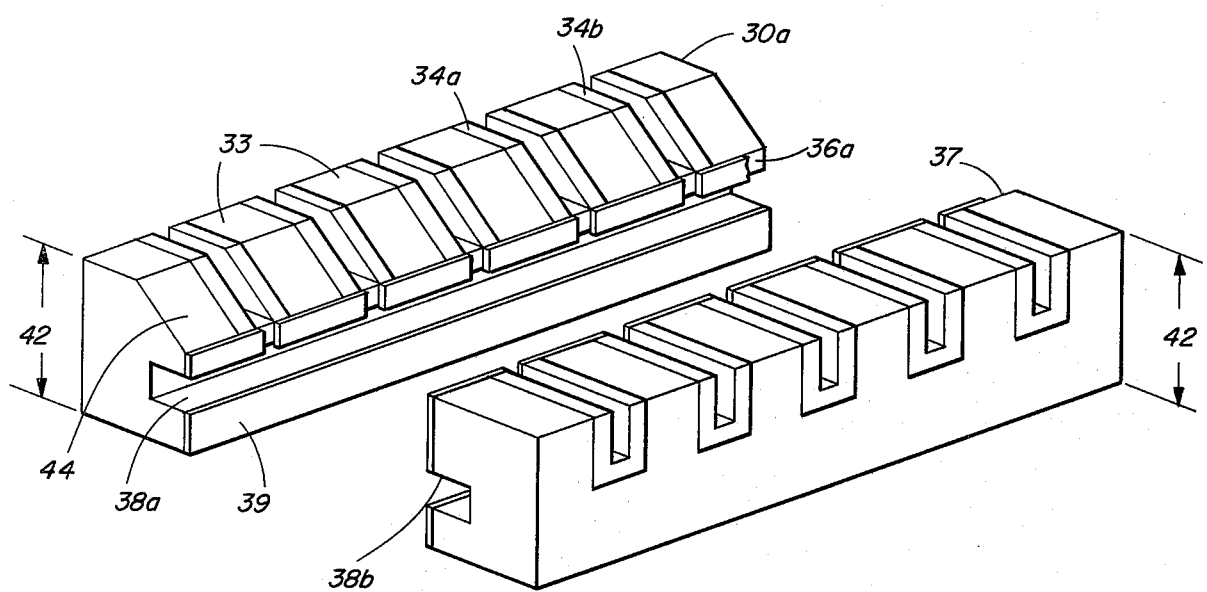
FIG. 5e

FIG. 5f
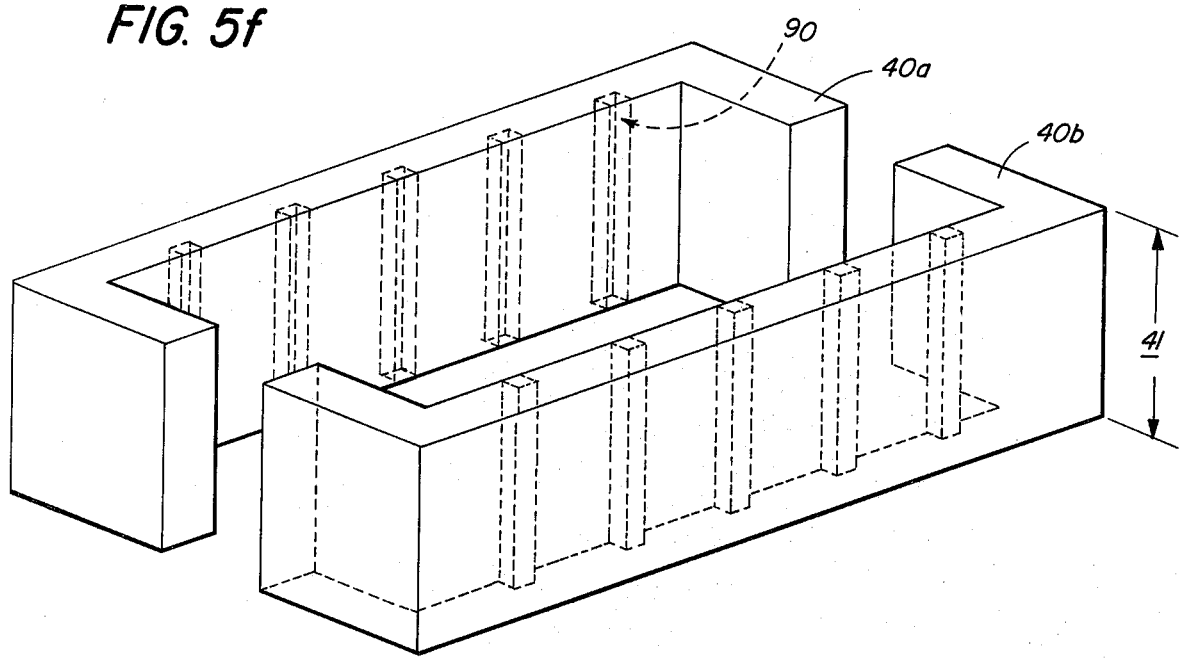
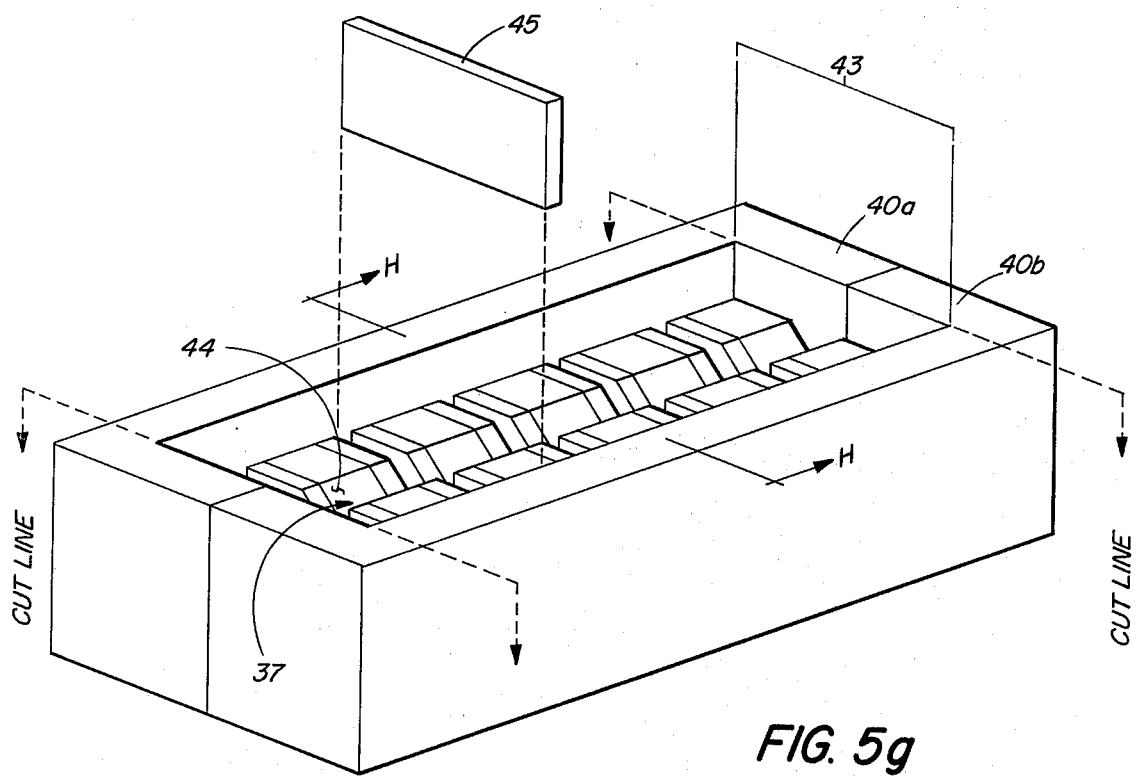
FIG. 5g

HIGH DENSITY MULTITRACK MAGNETIC HEAD

BACKGROUND OF THE INVENTION

1. Field of the Invention

This invention relates in general to magnetic heads and methods for making magnetic heads.

2. Description Relative to the Prior Art

Track width dimensions, and precise track-to-track spacing, is a continuing matter of concern for manufacturers of multitrack ferrite record/play heads. These considerations, and overall structural integrity, for such heads are especially critical to manufacture of high track density heads, e.g., heads having as many as 21 tracks per inch.

SUMMARY OF THE INVENTION

The invention provides a high track-density front face for a multitrack magnetic head by use of a method in which thin fragile ferrite track defining pieces, resulting from the slotting of a ferrite block, are supported by ceramic spacers. The spacers are slotted, and thereafter the block is halved. One (or both) of the block halves is chamfered, and the two halves are then placed in a ceramic surround, with the chamfer(s) topside. The surround has a depth deeper than the depth of the ferrite block, thereby forming a basin within which bonding glass is placed. By melting the glass, a head front face is formed in which the parts of the front face are all bonded together by means of a unitary lattice of glass.

BRIEF DESCRIPTION OF THE DRAWINGS

The invention will be described with reference to the drawings, wherein:

FIGS. 5A through 5K illustrate the steps involved in the method of manufacturing a presently preferred embodiment of the head assembly.

DESCRIPTION OF THE PREFERRED EMBODIMENTS

Figure 3:
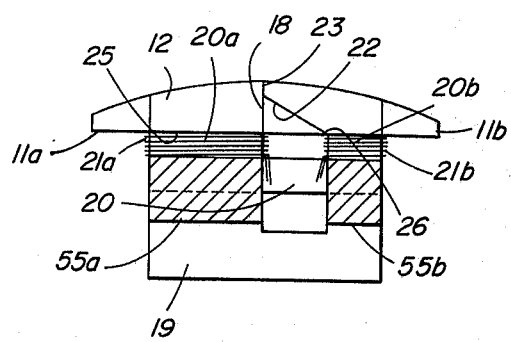
FIG. 3 is a section view of the head assembly of FIG. 1 taken along lines 3—3 thereof.
Figure 1:
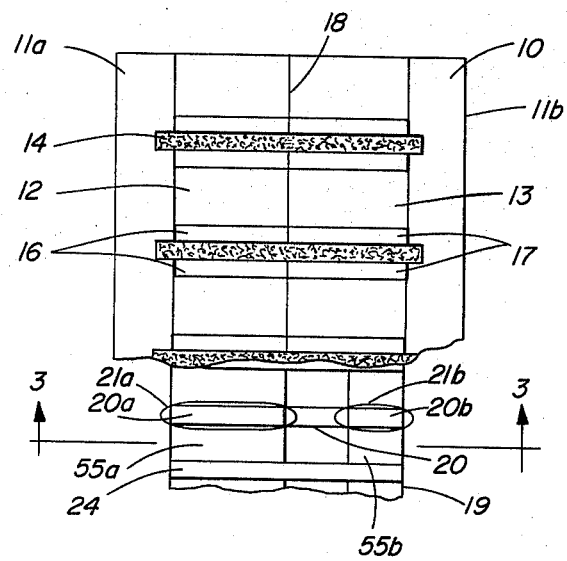
FIG. 1 is a front elevation view of the magnetic head partially cut away for clarity.
Figure 2:
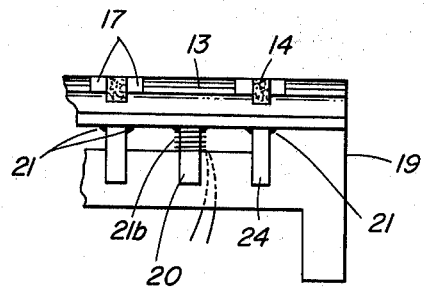
FIG. 2 is a side elevation view also partially cut away to display the internal components.

With reference to FIGS. 1-4, the magnetic head assembly of the present invention comprises part of a head face surround 10 of a ceramic material between which a plurality of separate pole pieces 12 and 13, shields 14 and spacers 16 and 17 are located. In accordance with the invention, each of the plurality of pole pieces 12 and 13, as well as the shields 14, are of a magnetic ferrite material. The spacers 16 and 17 may be of any suitable non-magnetic ceramic material; a ceramic-convertible glass such as FOTOCERAM (obtainable from Corning Glass) has been found useful for this purpose. Each of the plurality of spacers, pole pieces and shields are glass bonded to each other and to the surfaces of part 10 in contact therewith to form what shall be hereafter referred to as face 11. Face 11 is further formed in two half portions 11a and 11b, each carrying a half set of the pole pieces and spacers and a portion of the integral ferrite shield 14. In the completed head assembly, face portions 11a and 11b and the plurality of pole tips 12 and 13 and spacers 16 and 17 abut at a gap region 18 in which a layer of non-magnetic material is disposed to define the transducing gaps. Face surround 10 with the various pole pieces 12 and 13, spacers 16 and 17 and shields 14 mounted therein is fabricated as a unit and is thereupon mounted onto a back housing 19, preferably also of a ceramic material such as forsterite, carrying a plurality of magnetic core members 20, each provided with a pair of electrical coils 21a and 21b. Each core member 20 is arranged to engage associated pairs of pole pieces 12 and 13 of face 11 so as to complete a magnetic circuit in each case traversing the non-magnetic transducer gap at region 18. Thus separate branches 20a and 20b of each core member 20 are positioned so as to engage associated pole pieces 12 and 13 on opposite sides of the non-magnetic gap. In this manner, a plurality of transducers are formed, each comprising a pair of pole pieces carried in face 11 and a single integral core member mounted within back housing 19.

In order to define the depth of the transducing gap when the head is finished, pole pieces 12 and 13 are provided with a wedge-shaped well or groove 22 extending parallel and beneath the gap region 18 with the wedge apex defining the bottom of a non-magnetic gap 23 between each pair of pole pieces. In order to support the extremely shallow gap 23, the wedge-shaped groove 22 is filled with glass in a bonding operation to be described more fully hereinafter. It is to be noted that wedge-shaped groove 22 is entirely defined within face portion 11b in the sense that one edge thereof is chamfered to provide the groove opening. A head according to this presently preferred core cross-section requires a smaller core structure in back housing 19 than a head which provides for chamfering the equivalent of both face portions 11a and 11b. This diminished structure reduces the path lengths of flux through the magnetic structure and thereby increases the magnetic efficiency of the core 20 — pole pieces 12-13 combination. Due to the presently preferred magnetic geometry, the face portions 11a and 11b are non-symmetrical in cross-sectional form.

A plurality of "non-gapped" back shields 24 are provided in the back housing 19, each between an adjacent pair of core members 20. Referring now to FIG. 3, a planar surface 25 of face 11 is mounted on a corresponding planar surface 26 of back housing 19 such that the faces of pole pieces 12 and 13 flush with surface 25 engage surface portions of one of the core members 17 flush with surface 26 completing a magnetic circuit traversing the gap 23. The back shields 24 extend generally flush with the surface 26 of the back housing 19 and meet with and engage the shields 14 of the face part in a manner similar to the engagement of the pole tips and core members. In order to secure the face 11 to the back housing 19, an epoxy bond 21 is provided around the shields 24 at the rear of the cores 20.

Figure 5K:
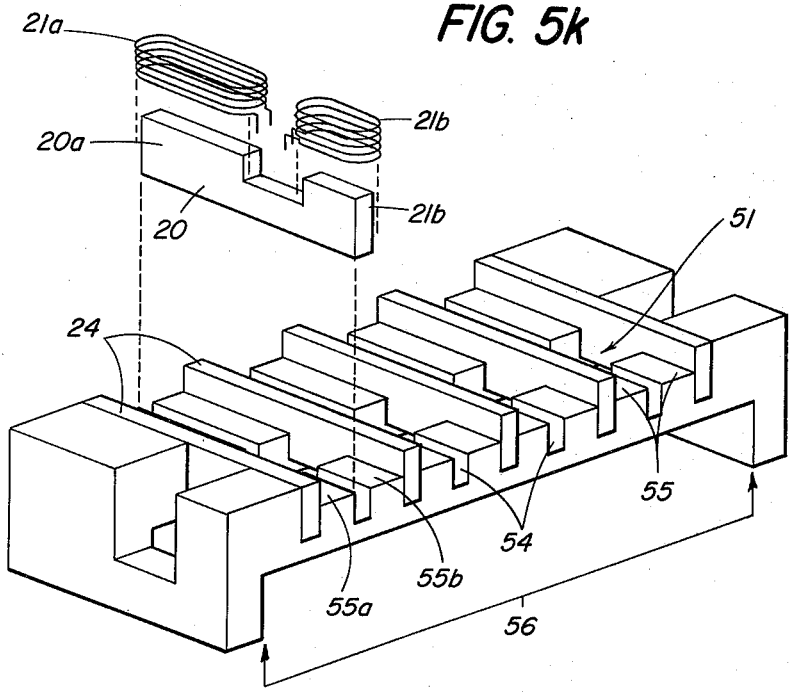
Figure 4:
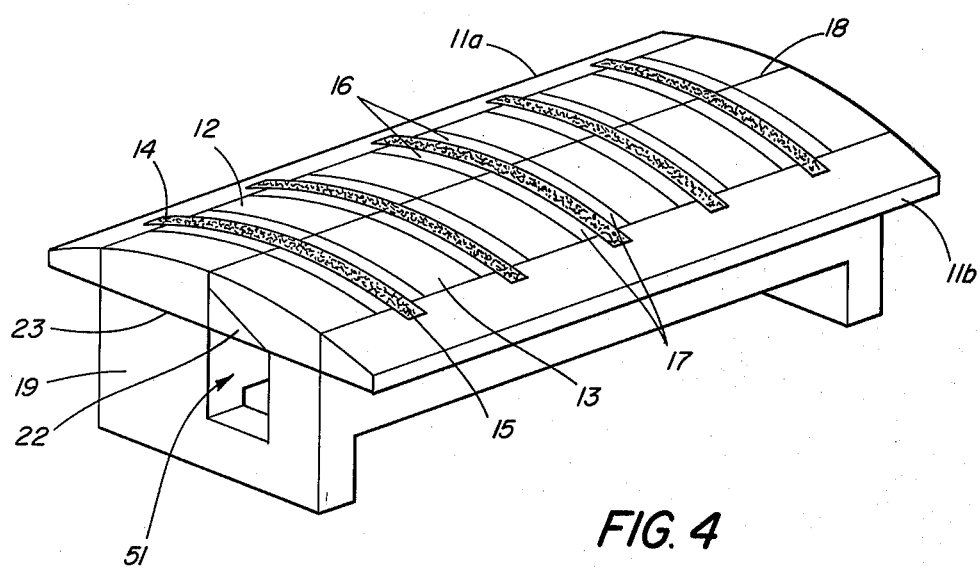
FIG. 4 is a perspective view of the magnetic head assembly.

In accordance with the method of the present invention illustrated in FIGS. 5A-5K, face 11 is initially formed from a rectangular block 30 of ferrite material in which a planar face 31 thereof is provided with a plurality of spaced, rectangular cross section slots 32. The block 30 is preferably of a hot pressed ferrite material that is suitable for use as pole tips. The slots 32 therefore define the individual ferrite abutments 33 and a precise track width 33a that is firmly established relative to the ends of the ferrite blocks in this fabrication technique. Thereupon, a plurality of elongate rectangular ceramic spacers 34, as best shown in FIG. 5B, are formed for mated insertion into each of the slots 32. In a preferred embodiment, the spacers 34 are formed from FOTOCERAM, a chemically machinable ceramic-convertible glass commercially available from Corning Glass Company. Finally, the ceramic spacers 34 are mated each with a slot 32 and glass bonded to the walls thereof.

Having mounted the various ceramic spacers within the slotted ferrite block 30, a plurality of slots 35 are formed in the block 30 each within the previously bonded ceramic spacers 34. As best seen in FIG. 5C, one such slot 35 is centrally cut in each spacer 34 to a depth less than the depth of the spacer, thereby providing the spacer with a U-shape. This is an important feature of the invention since it assures good support for the fragile pole pieces even after the ceramic spacers are provided with shield slots. In the presently preferred method, this second slotting operation results in the formation of two ceramic spacer arms 34a and 34b between each pair of ferrite abutments 33. The block assembly is now cut along a plane normal to face 31 as best illustrated in FIG. 5D and at right angles to ceramic spacers 34a and 34b so as to form two equal, severed half blocks 30a and 30b having opposing faces 36 and 37. The preceding method is particularly adapted to manufacture of high track density heads — those heads having densities on the order of 21 tracks or more per inch. Since these heads typically require a ferrite abutment 33 having a width 33a of 0.018 inches or even less, the ferrite block 30 will have many thin and fragile ferrite fingers that are susceptible to frequent damage during manufacture. During the present method, the exposure to handling damage is minimized; before the second slotting operating the ferrite track width abutments 33 are firmly supported by the bonded ceramic spacers 34. In this manner the brittle ferrite material is protected during the subsequent grinding of the ferrite shield slots 35 and the cutting of the block 30 into two half-blocks 30a and 30b. The delicate ferrite side walls of abutments 33 are never exposed unsupported to machining operations after their initial formation.

With reference now to FIG. 5E, the block portion 30a alone is provided with a bevelled face 44 cut at approximately 60° along a longitudinal edge of the severed half-block 30a intercepting each ferrite abutment 33 and ceramic spacers 34a and 34b as illustrated to leave a strip portion of the original planar face 36 as a surface 36a. Slots 38a and 38b are further provided in the ferrite half-blocks 30a and 30b in order to reduce the gapping surface areas (making it easier to lap these areas flat) and also to accept meltable glass rods for additionally bonding the blocks 30a and 30b. The half-blocks 30a and 30b are now lapped along face 37 and surface 36a to insure proper alignment of the ferrite abutments carried by each block when they are mounted together as described herein.

Having completed these steps, one or both of the surfaces 36a and 37 of the half-blocks 30a and 30b are disposed to receive a deposited layer of non-magnetic gap forming material, such as layer 39. This layer may be provided by a number of known processes and materials, such as by sputtering a thin layer of aluminum oxide ($Al_2O_3$) on the respective surfaces of each half-block.

At this point in the assembly, the half-blocks 30a and 30b are adapted for abutting against each other to establish the gap line. In a significant departure from the prior art, the present embodiment does not require that the half-blocks 30a and 30b be rotated by 90° about their longitudinal axes in order to meet in registration at their gap defining surface. Instead, the half-blocks 30a and 30b are merely rejoined in registration separated only by the layer 39. What this means is that the original orientation of the uncut block 30 is maintained throughout assembly. The actual assembly of the half-blocks 30a and 30b into the final head structure is accomplished by aligning the half-blocks into a pair of ceramic brackets 40a and 40b. The brackets are provided with a height-wise dimension 41 that so exceeds the corresponding height-wise dimension 42 of the half-blocks 30a and 30b (refer to FIG. 5E) that a basin — generally shown by 43 in FIG. 5G — is formed when the brackets 40a and 40b enclose the half-blocks during assembly.

The assembly of the half-blocks 30a and 30b is best shown in FIG. 5G where the parts have been enclosed by the brackets 40a and 40b, which together form the surround 10. The brackets 40a and 40b are so formed that when they are precisely abutted with the ferrite-ceramic half-blocks in between, the areas 37 and 36a of the half-blocks are automatically located substantially coextensive — with the respective portions of the ferrite abutments 33 and the ceramic spacers 34a and 34b opposite each other.

Figure 5H:
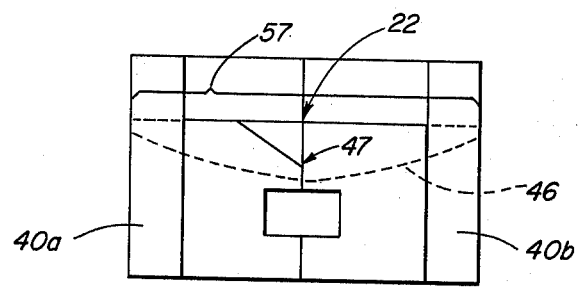

Half-blocks 30a and 30b are further secured together in their assembled relation by a plurality of ferrite shields — one of which is shown as shield 45 in FIG. 5G — which extend into the slots 35 across the gap line. It is to be noted that, because the shields are inserted after the half-blocks are cradled by the brackets 40a and 40b, the shields do not get gapped. Further, the brackets, preferably, are themselves slotted (see dotted slots 90 of FIG. 5F) to accept extra wide shields. This not only provides a better magnetic shielding between the cores, but provides additional strength for the head. See FIG. 5I. Bonding glass is placed in the basin 43 formed by the mating of the ceramic brackets 40a and 40b and, in a second glass bonding operation, the half-blocks 30a and 30b are bonded into the ceramic brackets and the ferrite shields 45 are bonded into the slots 35. With the bonding glass contained and flowing within the basin 43, a portion of the glass accumulates in the wedge-shaped groove 22 and firmly joins the two half-blocks together below the transducing gap. As best shown by FIG. 5H, the parts assembled thus far have a cross section (taken at H—H in FIG. 5G) which, after precontouring, will be described by the broken line 46 in FIG. 5H wherein the remaining gap line 47 becomes the transducer gap of the finished transducer. It is thus seen that the ceramic brackets 40a and 40b — essentially functioning as a workpiece during head assembly — are partly consumed during precontouring and partly retained as an integral portion of the head face.

Figure 5I:
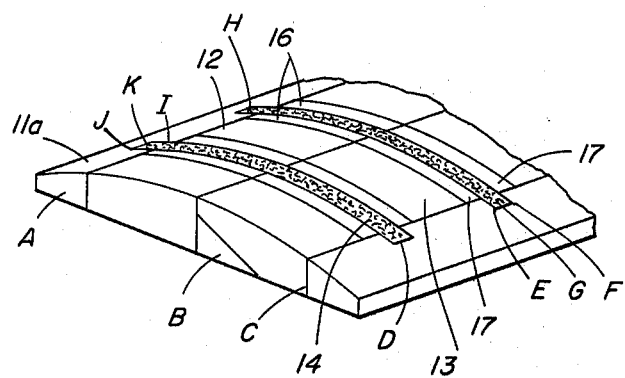

The assembly resulting from these method steps is illustrated in FIG. 5I and will henceforth be identified, in accordance with FIGS. 1-4, as face 11 consisting of two half portions 11a and 11b. Similarly, ferrite abutments 33 now become pole pieces 12 and 13, ceramic spacers 34 become spacers 16 and 17, and ferrite shield 45 becomes shield 14. The structure of FIG. 5I is characterized by the glass forming the bonds at A through K, etc. being integral, and in the form of a lattice.

Figure 5J:
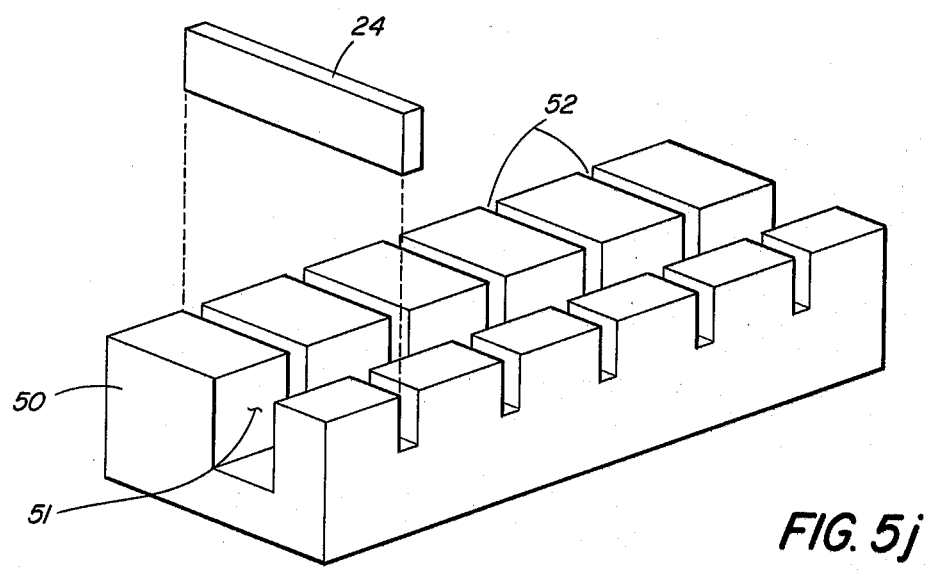

With reference to FIG. 5J, a back housing 19 is formed from a ceramic block 50 that is provided with a longitudinal channel 51 and narrower transverse slots 52 that descend in the block 50 to a depth less than the depth of the longitudinal slot 51. In a preferred embodiment the block 50 is formed of forsterite, or similar ceramic. The slots 52 are located in positions corresponding to the planar exposure of shields 15 along planar surface 25 of face 11. Then the plurality of back shield members 24 are glass bonded into the plurality of slots 52. The resultant structure is slotted in a two step grinding operation best illustrated by FIG. 5K. First a deeper slot 54 is cut into the ceramic material remaining between each back shield 24. This slot provides space for the u-shaped back core 20 that is formed for mated insertion into the portion of slot 54 remaining after the second grinding operation. In the second step of the grinding operation, all the remaining ceramic material between each back shield 24 is shallowly removed, leaving a new slot 55 and a portion of the slot 54 remaining at the bottom thereof. Next the aforementioned back core 20 is bonded into the remaining portion of the slot 54. It is noted that the separate branches 20a and 20b of the core member 20 extend above the bottom edge of the slots 55 thereby forming shoulders 55a and 55b. The pair of coils 21a and 21b are inserted over the branch members 20a and 20b respectively and rest upon the shoulders 55a and 55b.

An elongate slot 56 is provided through the bottom of back housing 19 such that it intersects the channel 51 precut into the ceramic block 50. With the channel 51 partially cut-away, the interior of the slots 54 are exposed to the bottom of the back housing 19 through the now-open channel 51. The leads from the coils 21a and 21b are directed through the slots 51 and out the open channel 56 to suitable connectors (not shown) on a rear housing terminal board. Prior to assembling the final head structure, the mating surfaces of the block 50, the back shields 24 and the branch members 20a and 20b are polished to a common planar surface. Then a surface of the face 11, and identified by the bracket 57 in FIG. 5H, is correspondingly polished. Finally, the face 11 is mounted on the back housing 19 with various pole pieces 12 and 13, and shields 14, in registration with core members 20 and back shields 24. With all parts in proper registration, each is secured to another by an epoxy bond as mentioned in connection with FIG. 3. This feature permits subsequent removal of face 11, should it prove initially defective or thereafter become defective in operation, merely by grinding away the face part until the surface 26 of back housing 19 is reached. Thereupon surface 26 may be relapped and a new face 11 installed.

The invention has been described in detail with particular reference to preferred embodiments thereof, but it will be understood that variations and modifications can be effected within the spirit and scope of the invention.

What is claimed is:

1. The head face portion of a multitrack magnetic head comprising:
   a. pairs of first and second magnetic pole pieces, each said pole pair having a non-magnetic generally planar gap between the pole pieces of said pole pair, at least one pole piece of each pole pair being cutaway proximate the gap of that pole pair so as to taper generally away from the plane of said gap in a direction generally away from the tape contacting face, thereby to define a depth for the gap of that pole pair and to provide a well proximate the gap,
   b. non-magnetic spacer means sandwiched between the first and second pole pairs, said non-magnetic spacer means also being cutaway so as to provide a well therein that is substantially aligned in registry with the wells defined by the cutaways of said pole pairs, said spacer means being further provided with a slot for accepting a magnetic shield piece between said first and second pole pairs.
   c. a magnetic shield in said slot,
   d. first discrete non-magnetic edge support means (11a) having a face that is substantially parallel to the alignment of wells, said support means abutting said sandwich of pole pairs and spacer means,
   e. second discrete non-magnetic edge support means (11b) having a face that is substantially parallel to the alignment of wells, said second support means abutting said sandwich of pole pairs and spacer means, said first and second edge support means being disposed with respect to each other so as to sandwich said pole pairs between them, said first and second edge support means being both adapted to contact simultaneously a magnetic medium with which said head is cooperative, and
   f. glass filling all said wells, the spacings between both said edge support means and said sandwich of pole pairs and spacer means, and the spacing between said spacer means and said shield, said glass being integral and forming a unitary lattice that bonds all the parts of the face assembly together.

2. The head face portion of claim 1 wherein said first (11a) and second (11b) non-magnetic edge support means are provided with slots that align with said shield slot, and wherein said shield extends into the slots of said first and second non-magnetic edge support means.

3. The head face portion of a multitrack magnetic head comprising:
   a. a stack of pole tip pairs,
   b. non-magnetic gap defining means between the tips of each pole pair,
   c. non-magnetic spacer means between each tip pair in said stack, at least some of said spacer means being provided with a magnetic shield-accepting slot,
   d. magnetic shields in said spacer slots,
   e. said stack of spacers and tip pairs being provided with an elongated well running longitudinally of the axis of said stack, thereby to define gap depths for the respective pole tip pairs of said stack, said well being positioned remote from the head face adapted to contact a medium with which the head is cooperative,
   f. discrete non-magnetic wing elements (11a, 11b) running longitudinally with respect to the elongated well of the stack and sandwiching said stack therebetween, said wing elements being so disposed with respect to said stack that both said wing elements are adapted to contact simultaneously a magnetic medium with which said head is cooperative, and
   g. an integral and unitary lattice of glass occupying the well, the spacings between said shields and their respective slots, and the spacings between said wing elements and said stack, and bonding said parts together.

4. The structure of claim 3 wherein said wing elements are provided with shield accepting slots aligned with said spacer means slots, wherein at least some of said shields extend into said wing slots.

5. The head face portion of a multitrack magnetic head comprising:
   a. a stack of pole tip pairs,
   b. non-magnetic gap defining means between the tips of each pole pair,
   c. non-magnetic spacer means between each tip pair in said stack and spacer means being generally U-shaped, and being thereby provided with a slot,
   d. magnetic shields within the spacer means slots,
   e. said stack of spacers and tip pairs being provided with a well running longitudinally of the axis of said stack, thereby to define gap depths for the pole tip pairs of said stack, said well being positioned remote from the head face which is adapted to contact a magnetic medium with which the head is cooperative,
   f. discrete non-magnetic wings (11a, 11b) running longitudinally with respect to the well of the stack and so sandwiching said stack therebetween that the wings may simultaneously contact a magnetic medium with which said head is cooperative, and
   g. an integral and unitary web of glass filling the well, the spacings between the shields and U-shaped spacer means, and the spacings between said wings and said stack, and bonding the parts of said front face together.

6. The structure of claim 5 wherein said wing parts are provided with shield-accepting slots aligned with said spacer slots, and wherein at least some of said shields extend into said wing slots.

* * * * *